(12) United States Patent
Yang et al.

(10) Patent No.: US 8,134,655 B2
(45) Date of Patent: Mar. 13, 2012

(54) LIQUID CRYSTAL DISPLAY

(75) Inventors: Yunsung Yang, Daegu (KR); Juyoung Lee, Gumi-si (KR); Wookyu Sang, Chilgok-gun (KR)

(73) Assignee: LG Display Co., Ltd., Seoul (KR)

( * ) Notice: Subject to any disclaimer, the term of this patent is extended or adjusted under 35 U.S.C. 154(b) by 294 days.

(21) Appl. No.: 12/580,971

(22) Filed: Oct. 16, 2009

(65) Prior Publication Data
US 2010/0302493 A1    Dec. 2, 2010

(30) Foreign Application Priority Data
May 26, 2009    (KR) .......................... 10-2009-0045870

(51) Int. Cl.
    *G02F 1/1333*    (2006.01)
(52) U.S. Cl. .......................................................... 349/58
(58) Field of Classification Search .................... 349/58, 349/149–150
    See application file for complete search history.

(56) References Cited

U.S. PATENT DOCUMENTS
| | | | |
|---|---|---|---|
| 6,734,926 B2 * | 5/2004 | Fan et al. | 349/58 |
| 6,862,053 B2 * | 3/2005 | Lee et al. | 349/58 |
| 7,570,316 B2 * | 8/2009 | Kim | 349/58 |

* cited by examiner

*Primary Examiner* — James Dudek
(74) *Attorney, Agent, or Firm* — Birch, Stewart, Kolasch & Birch, LLP (57) ABSTRACT

A liquid crystal display is disclosed. The liquid crystal display includes a liquid crystal module including a liquid crystal display panel and a backlight unit underlying the liquid crystal display panel and a printed circuit board (PCB) connected to the liquid crystal display panel through one of a tape carrier package (TCP), on which integrated circuits (ICs) are mounted, and a flexible circuit board. An edge of the liquid crystal module has an inclined surface inclined at an angle smaller than 90° from one of a top surface and a bottom surface of the liquid crystal module. The PCB is faced to the inclined surface.

10 Claims, 9 Drawing Sheets

LIQUID CRYSTAL DISPLAY

This application claims the benefit of Korea Patent Application No. 10-2009-0045870 filed on May 26, 2009, the entire contents of which is incorporated herein by reference for all purposes as if fully set forth herein.

BACKGROUND OF THE INVENTION

1. Field of the Invention

Embodiments of the invention relate to a liquid crystal display.

2. Discussion of the Related Art

Active matrix type liquid crystal displays display a moving picture using a thin film transistor (TFT) as a switching element. The active matrix type liquid crystal displays have been implemented in televisions as well as display devices in portable devices, such as office equipment and computers, because of the thin profile of an active matrix type liquid crystal displays. Accordingly, cathode ray tubes (CRT) are being rapidly replaced by active matrix type liquid crystal displays.

A liquid crystal display generally includes a liquid crystal display panel, a backlight unit providing light to the liquid crystal display panel, source driver integrated circuits (ICs) supplying a data voltage to data lines of the liquid crystal display panel, gate driver ICs supplying a gate pulse (i.e., a scan pulse) to gate lines (i.e., scan lines) of the liquid crystal display panel, a control circuit controlling the source driver ICs and the gate driver ICs, a light source driving circuit driving a light source of the backlight unit, a DC to DC converter generating driving voltages of the liquid crystal display panel and voltages required to drive the source driver ICs, the gate driver ICs, and the control circuit, and the like. In a module assembly process of the liquid crystal display, printed circuit boards (PCBs), on which the liquid crystal display panel, the backlight unit, the source driver ICs, the gate driver ICs, and the control circuit are mounted, are assembled into a liquid crystal module using case members. The PCBs of the liquid crystal module are connected to a system board by a set maker.

The PCBs of the liquid crystal module may be connected to the liquid crystal display panel using a tape carrier package (TCP). The PCBs of the liquid crystal module and the TCP may be assembled parallel to a glass substrate of the liquid crystal display panel. If the PCBs of the liquid crystal module and the TCP are assembled parallel to the glass substrate of the liquid crystal display panel, a bezel area may increase by the size corresponding to the size of the PCBs and the size of the TCP. Hence, a display surface of the liquid crystal display panel relatively may decrease. The PCBs of the liquid crystal module may be folded in the rear of the backlight unit through the bendable TCP. The bezel area may decrease because of a folding structure of the PCBs, but a thickness of the liquid crystal module may increase because of a thickness of the PCBs. In case the number of source driver ICs increases because of an increase in a resolution of the liquid crystal module or an image quality processing circuit for achieving a high-definition image is additionally mounted on the PCB of the liquid crystal module, the size of the PCB may increase.

SUMMARY OF THE INVENTION

Embodiments of the invention provide a thin profile liquid crystal display having a minimum bezel area.

In one aspect, there is a liquid crystal display comprising a liquid crystal module including a liquid crystal display panel and a backlight unit underlying the liquid crystal display panel and a printed circuit board (PCB) connected to the liquid crystal display panel through one of a tape carrier package (TCP), on which integrated circuits (ICs) are mounted, and a flexible circuit board, wherein an edge of the liquid crystal module has an inclined surface inclined at an angle smaller than 90° from one of a top surface and a bottom surface of the liquid crystal module, wherein the PCB is faced to the inclined surface.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

A method of manufacturing a liquid crystal display according to an embodiment of the invention includes a process for cleansing substrates of a liquid crystal display panel, a process for patterning the substrates, a process for forming and rubbing alignment layers, a process for sealing the substrates and dropping liquid crystals, a process for mounting driving circuits, a module assembly process, and the like.

The substrate cleansing process is a process for removing polluted materials from the surfaces of upper and lower glass substrates of the liquid crystal display panel using a cleansing solution. The substrate patterning process includes a process for forming and patterning various thin film materials, such as signal lines including data lines and gate lines, thin film transistors (TFTs), and pixel electrodes, on the lower glass substrate and a process for forming and patterning various thin film materials, such as a black matrix, a color filter, and a common electrode, on the upper glass substrate. In the process for forming and rubbing the alignment layers, alignment layers are respectively coated on the upper and lower glass substrates, and then are rubbed using a rubbing cloth or are photo-alignment processed. After the above-described processes are performed, a pixel array is formed on the lower glass substrate of the liquid crystal display panel. The pixel array includes data lines receiving a video data voltage, gate lines that cross the data lines and sequentially receive a scan signal (i.e., a gate pulse), TFTs formed at each of crossings of the data lines and the gate lines, pixel electrodes of liquid crystal cells respectively connected to the TFTs, a storage capacitor, and the like. A shift register of a gate drive circuit generating the scan signal may be formed at the same time as the pixel array during the substrate patterning process. A black matrix, a color filter, and a common electrode are formed on the upper glass substrate of the liquid crystal display panel. The common electrode is formed on the upper glass substrate in a vertical electric field driving manner, such as a twisted nematic (TN) mode and a vertical alignment (VA) mode. The common electrode and the pixel electrode are formed on the lower glass substrate in a horizontal electric field driving manner, such as an in-plane switching (IPS) mode and a fringe field switching (FFS) mode. Polarizing plates are attached respectively to the upper and lower glass substrates, and protective films are attached respectively to the polarizing plates.

In the process for sealing the substrates and dropping the liquid crystals, in a vacuum chamber, a sealant is drawn on one of the upper and lower glass substrates, and the liquid crystals are dropped onto the other glass substrate. Supposing that the liquid crystals are dropped onto the lower glass substrate, an ultraviolet curable sealant is formed on the upper glass substrate in the vacuum chamber. The upper glass substrate on which the ultraviolet curable sealant is formed is reversed and is fixed on an upper stage, and the lower glass substrate onto which the liquid crystals are dropped is fixed on a lower stage. Hence, the upper and lower glass substrates are aligned. Subsequently, a pressure is applied to one of the upper and lower glass substrates in a state where a pressure of the vacuum chamber is adjusted to a predetermined vacuum pressure by driving a vacuum pump to seal the upper and lower glass substrates to each other. In this case, a cell gap of a liquid crystal layer between the upper and lower glass substrates is set at a greater value than a cell gap set in the design. Subsequently, nitrogen ($N_2$) is injected into the vacuum chamber to adjust the pressure of the vacuum chamber to an atmospheric pressure. Hence, the cell gap of the liquid crystal layer is set at the cell gap set in the design because of a difference between a pressure inside the sealed glass substrates and the pressure of the vacuum chamber. In the state where the cell gap is set at the design value, ultraviolet rays from an ultraviolet light source are irradiated onto the ultraviolet curable sealant through the upper glass substrate or the lower glass substrate to cure the ultraviolet curable sealant.

In the process for mounting the driving circuit, source driver integrated circuits (ICs) of a data drive circuit are mounted on the lower glass substrate of the liquid crystal display panel through a chip on glass (COG) process or a tape automated bonding (TAB) process. In the COG process, the source driver ICs are directly attached to the lower glass substrate and are connected to the data lines of the lower glass substrate. In the TAB process, tape carrier packages (TCPs), on which the source driver ICs are mounted, are attached to the lower glass substrate and are connected to the data lines. The source driver ICs are connected to a printed circuit board (PCB) through the TCP or a flexible circuit board. The flexible circuit board may be selected among a flexible printed circuit board (FPC) and a flexible flat cable (FFC). Gate driver ICs of the gate drive circuit may be directly formed on the lower glass substrate and may be connected to the gate lines of the lower glass substrate through a Gate In Panel (GIP) process at the same time as the forming of the pixel array. Otherwise, the gate driver ICs may be attached to the lower glass substrate and may be connected to the gate lines of the lower glass substrate through the TAB process.

In the module assembly process, light sources of a backlight unit are connected to a light source driving circuit, and the backlight unit and the liquid crystal display panel are assembled into a liquid crystal module using a case member, such as a guide panel, a bottom cover, and a top case, as shown in FIGS. 2 to 9. In the module assembly process, the PCB connected to the lower glass substrate of the liquid crystal display panel is faced to an inclined edge surface of the liquid crystal module and is fixed.

The method of manufacturing the liquid crystal display according to the embodiment of the invention may further include an inspection process and a repair process.

The inspection process includes an inspection of the ICs, an inspection of the signal lines, such as the data lines and the gate lines, on the lower glass substrate, an electrical inspection for detecting whether the TFTs and the pixel electrodes are defective, an electrical inspection conducted after the process for sealing the substrates and dropping the liquid crystals is performed, an lighting inspection for detecting whether the liquid crystal module is defective by turning on the backlight unit of the liquid crystal module, and the like. The repair process is performed on the defective signal lines and the defective TFTs that are determined as a repairable defective through the inspection process.

Reference will now be made in detail embodiments of the invention examples of which are illustrated in FIGS. 1 to 9.

Figure 1:
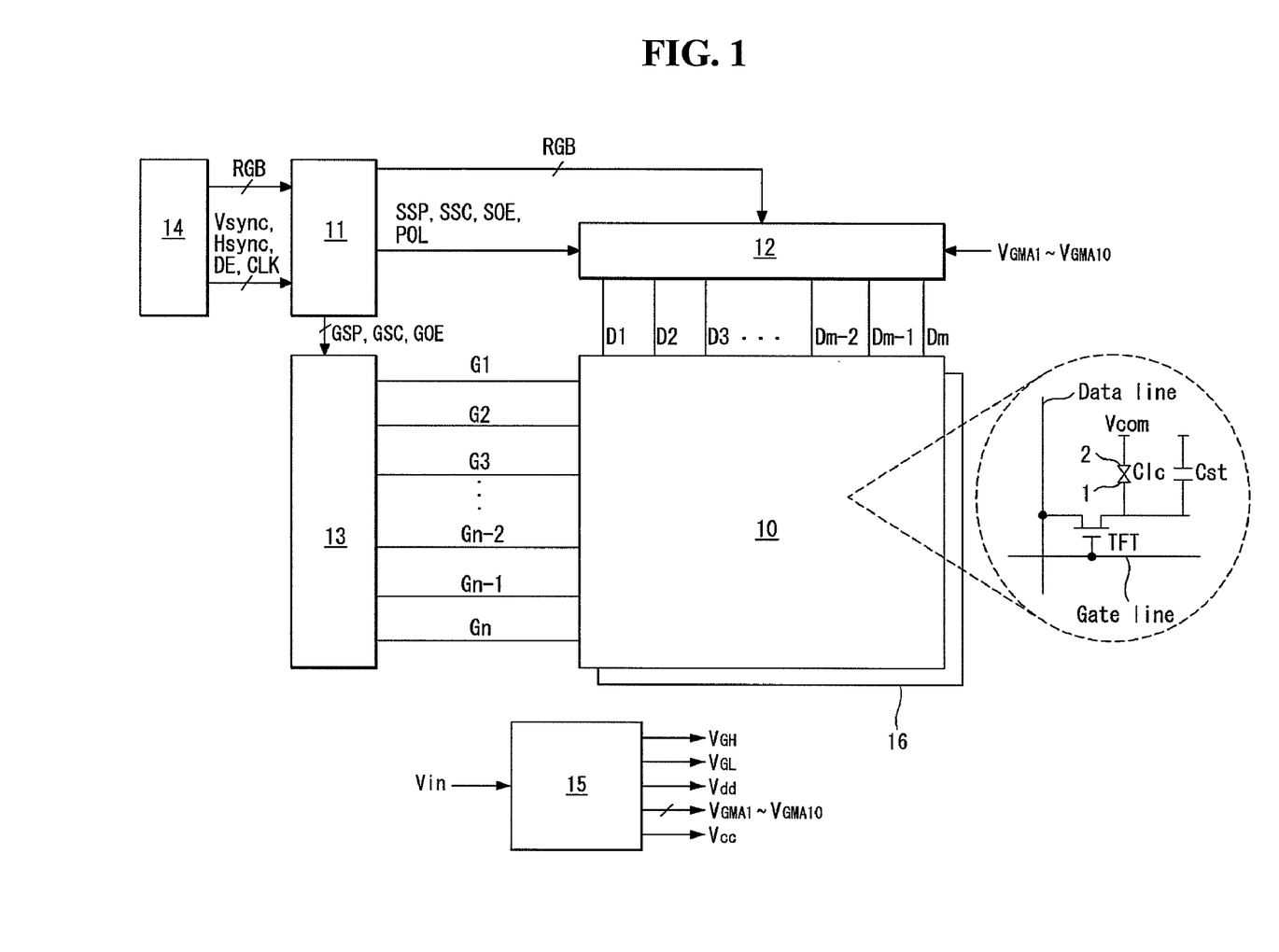
FIG. 1 is a block diagram illustrating a liquid crystal display according to an embodiment of the invention.
Figure 2:
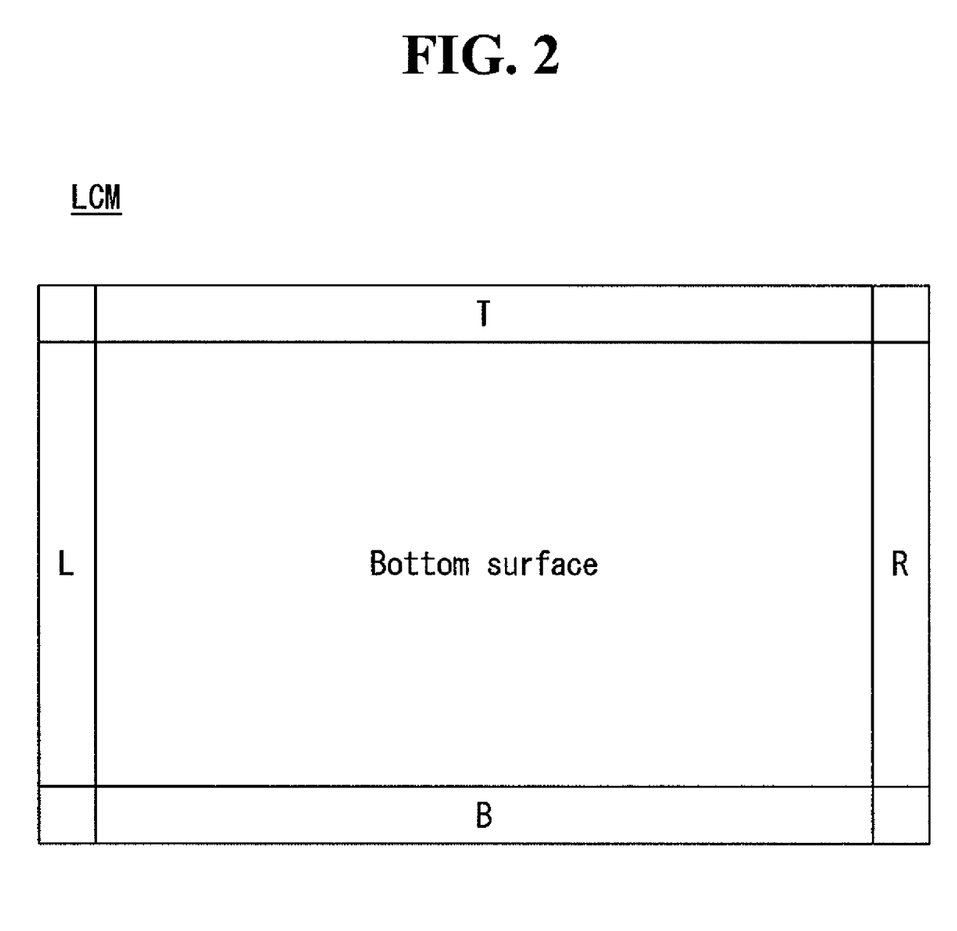
FIG. 2 is a plane view showing a bottom surface of a liquid crystal module according to a first embodiment of the invention.

As shown in FIGS. 1 and 2, a liquid crystal display according to an embodiment of the invention includes a liquid crystal display panel 10, a backlight unit 16 underlying the liquid crystal display panel 10, a data drive circuit 12 connected to data lines D1 to Dm of the liquid crystal display panel 10, a gate drive circuit 13 connected to gate lines G1 to Gn of the liquid crystal display panel 10, a timing controller 11 for controlling the data drive circuit 12 and the gate drive circuit 13, and a DC to DC converter 15 generating a driving voltage of the liquid crystal display panel 10.

The liquid crystal display panel 10 includes an upper glass substrate and a lower glass substrate that are positioned opposite each other with a liquid crystal layer interposed between the upper glass substrate and the lower glass substrate. The liquid crystal display panel 10 includes a pixel array displaying video data. The pixel array of the lower glass substrate includes a TFT formed at each of crossings of the data lines D1 to Dm and the gate lines G1 to Gn and pixel electrodes 1 connected to the TFTs. The liquid crystal display panel 10 displays an image of the video data through a control of a transmitted amount of light provided by the backlight unit 16 by driving each of liquid crystal cells Clc of the pixel array by a difference between a data voltage applied to the pixel electrodes 1 through the TFTs and a common voltage Vcom applied to a common electrode 2 through the TFT.

A black matrix, a color filter, and the common electrode 2 are formed on the upper glass substrate of the liquid crystal display panel 10. The common electrode 2 is formed on the upper glass substrate in a vertical electric field driving manner, such as a TN mode and a VA mode. The common electrode 2 and the pixel electrode 1 are formed on the lower glass substrate in a horizontal electric field driving manner, such as an IPS mode and a FFS mode.

Polarizing plates are respectively attached to the upper and lower glass substrates of the liquid crystal display panel 10. Alignment layers for setting a pre-tilt angle of liquid crystals are respectively formed on the upper and lower glass substrates.

The liquid crystal display panel 10 applicable to the embodiment of the invention may be implemented in any liquid crystal mode as well as the TN, VA, IPS, and FFS modes. The liquid crystal display according to the embodiment of the invention may be implemented in any type liquid crystal display including a backlit liquid crystal display, a transflective liquid crystal display, and a reflective liquid crystal display. A backlight unit is necessary in the backlit liquid crystal display and the transflective liquid crystal display. The backlight unit 16 may be implemented as a direct type backlight unit or an edge type backlight unit.

The data drive circuit 12 includes a plurality of source driver ICs. Each of the source driver ICs samples and latches R, G, and B digital video data input from the timing controller 11 in response to a data control signal received from the timing controller 11 to convert the R, G, and B digital video data into parallel data. Each of the source driver ICs converts the deserialized R, G, and B digital video data into an analog gamma compensation voltage using positive or negative gamma reference voltages VGMA1 to VGMA10 from the DC to DC converter 15 to generate a positive or negative analog video data voltage to which the liquid crystal cells will be charged. While each of the source driver ICs inverts a polarity of the positive/negative analog video data voltage in response to a polarity control signal, each of the source driver ICs supplies the positive/negative analog video data voltage to the data lines D1 to Dm. The source driver ICs may be connected to the data lines D1 to Dm through a COG process or a TAB process.

The gate drive circuit 13 includes a plurality of gate driver ICs. Each of the gate driver ICs includes a shift register sequentially shifting a gate driving voltage in response to a gate control signal from the timing controller 11 to sequentially supply a gate pulse (i.e., a scan pulse) to the gate lines G1 to Gn. The gate driver ICs may be connected to the gate lines G1 to Gn of the lower glass substrate through the TAB process or may be directly formed on the lower glass substrate through a GIP process.

The timing controller 11 receives the R, G, and B digital video data and timing signals, such as a vertical sync signal Vsync, a horizontal sync signal Hsync, a data enable signal DE, and a dot clock CLK, from a system board 14 through an interface receiving circuit, such as a low voltage differential signaling (LVDS) interface and a transition minimized differential signaling (TMDS) interface. The timing controller 11 transfers the R, G, and B digital video data to each of the source driver ICs of the data drive circuit 12 in a mini LVDS interface manner. The timing controller 11 generates a data control signal for controlling operation timing of the source driver ICs and a gate control signal for controlling operation timing of the gate driver ICs using the timing signals Vsync, Hsync, DE, and CLK. The timing controller 11 may multiply a frequency of each of the data control signal and the gate control signal based on a frame frequency of (60×i) Hz (where "i" is a positive integer), so that digital video data input at a frame frequency of 60 Hz can be reproduced in the pixel array of the liquid crystal display panel 10 at the frame frequency of (60×i) Hz.

The data control signal includes a source start pulse SSP, a source sampling clock SSC, a source output enable signal SOE, a polarity control signal POL, and the like. The source start pulse SSP controls a start time point of a data sampling operation of the data drive circuit 12. The source sampling clock SSC controls a data sampling operation inside the source driver ICs based on a rising or falling edge. If a signal transfer manner between the timing controller 11 and the source driver ICs of the data drive circuit 12 is the mini LVDS interface, the source start pulse SSP and the source sampling clock SSC do not need to be input to the source driver ICs. The polarity control signal POL inverts a polarity of the data voltage output from the data drive circuit 12 every N horizontal periods, where N is a positive integer. The source output enable signal SOE controls output timing of the data drive circuit 12. When a polarity of the data voltage supplied to the data lines D1 to Dm is inverted, each of the source driver ICs supplies a charge share voltage or the common voltage Vcom to the data lines D1 to Dm in response to a pulse of the source output enable signal SOE and supplies the data voltage to the data lines D1 to Dm during a low logic period of the source output enable signal SOE. The charge share voltage is an average voltage of the neighboring data lines to which the data voltages with opposite polarities are supplied.

The gate control signal includes a gate start pulse GSP, a gate shift clock GSC, a gate output enable signal GOE, and the like. The gate start pulse GSP controls timing of a first gate pulse. The gate shift clock GSC is a clock for shifting the gate start pulse GSP. The gate output enable signal GOE controls output timing of the gate drive circuit 13.

The system board 14 transfers the timing signals, such as the vertical sync signal Vsync, the horizontal sync signal Hsync, the data enable signal DE, and the dot clock CLK, together with the R, G, and B digital video data received from a broadcast receiving circuit or an external video source to the timing controller 11 through a LVDS interface transmitting circuit or a TMDS interface transmitting circuit. The system board 14 includes a graphic processing circuit, such as a scaler, and a power circuit. The graphic processing circuit interpolates a resolution of the R, G, and B digital video data in conformity with a resolution of the liquid crystal display panel 10 and performs a signal interpolation processing on the R, G, and B digital video data. The power circuit produces a voltage Vin to be supplied to the DC to DC converter 15.

The DC to DC converter 15 adjusts the voltage Vin received from the power circuit of the system board 14 to generate a driving voltage of the liquid crystal display panel 10. The driving voltage of the liquid crystal display panel 10 includes a high potential source voltage Vdd of 15V-20V, a logic source voltage Vcc of about 3.3V, a agate high voltage VGH equal to or greater than 15V, a gate low voltage VGL equal to or less than −3V, the common voltage Vcom of 7V-8V, the positive or negative gamma reference voltages VGMA1 to VGMA10, a core power voltage of 1.2V-1.8V, etc.

Figure 3:
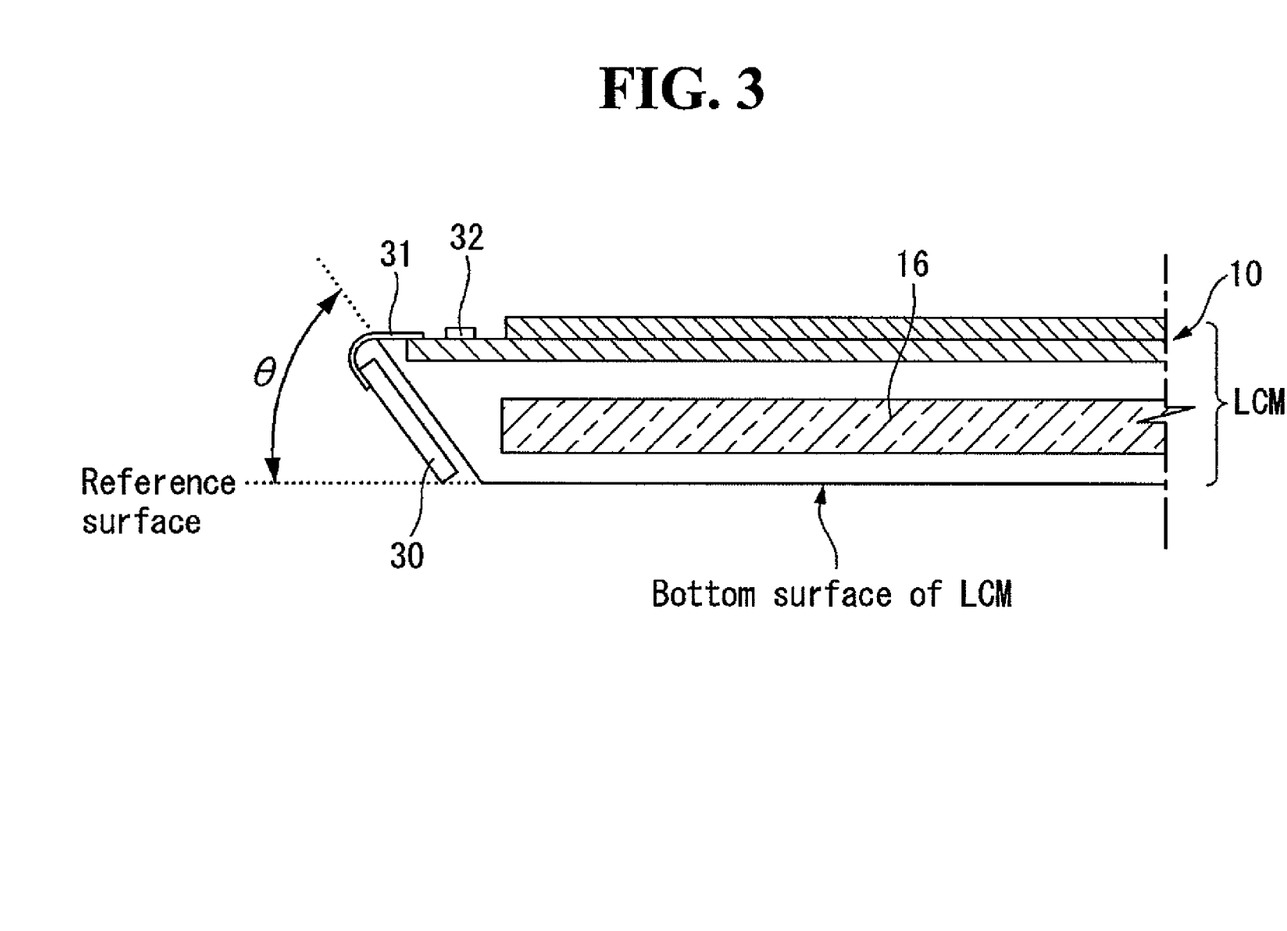
FIG. 3 is a cross-sectional view showing an inclined edge surface of the liquid crystal module of FIG. 2.

FIG. 2 is a plane view showing a bottom surface of a liquid crystal module according to a first embodiment of the invention. FIG. 3 is a cross-sectional view showing an inclined edge surface of the liquid crystal module of FIG. 2.

As shown in FIGS. 2 and 3, a liquid crystal module LCM according to the first embodiment of the invention includes a liquid crystal display panel 10, a backlight unit 16 underlying the liquid crystal display panel 10, and a PCB 30 connected to the liquid crystal display panel 10.

The liquid crystal module LCM has a rectangular structure. A display screen of the liquid crystal display panel 10 is exposed from a top surface of the liquid crystal module LCM. The backlight unit 16 and a bottom cover to be described later are positioned on a bottom surface of the liquid crystal module LCM. An upper edge surface T, a lower edge surface B, a left edge surface L, and a right edge surface R exist at edges of the bottom surface of the liquid crystal module LCM. At least one of the upper edge surface T, the lower edge surface B, the left edge surface L, and the right edge surface R is inclined at a predetermined angle. The PCB 30 is positioned on the inclined edge surface. A plurality of lines connecting a timing controller 11 (refer to FIG. 1) and a DC to DC converter 15 (refer to FIG. 1) to source driver ICs 32 may be formed on the PCB 30. The timing controller 11 and the DC to DC converter 15 may be mounted on the PCB 30. Furthermore, a graphic processing circuit and a power circuit of a system board 14 (refer to FIG. 1) may be mounted on the PCB 30. The PCB 30 may be connected to a lower glass substrate of the liquid crystal display panel 10 via a TCP on which the source driver ICs 32 are mounted. Further, the PCB 30 may be connected to the source driver ICs 32 attached to the lower glass substrate of the liquid crystal display panel 10 using a flexible circuit board 31 through a COG process. The PCB 30 is faced to the inclined edge surface formed on the bottom surface of the liquid crystal module LCM. The PCB 30 may include a plurality of PCBs, so that the PCB 30 can be divided and positioned on at least two inclined edge surfaces. Thus, the PCB 30 may be fixed on the inclined edge surfaces using means, such as an adhesive, a double-sided adhesive tape, and a screw. As a result, the PCB 30 may be incliningly fixed to the liquid crystal module LCM at an inclined angle θ of the inclined edge surface using such a fixing method.

The inclined edge surface is inclined at an angle smaller than 90° from the bottom surface of the liquid crystal module LCM. Preferably, the inclined angle θ of the inclined edge surface may be greater than 0° and less than 45° to a reference plane extending from the bottom surface of the liquid crystal module LCM. The inclined angle θ of the inclined edge surface may be selected in consideration of the size of the PCB 30. For example, as the size of the PCB 30 increases, the inclined angle θ of the inclined edge surface is selected at an angle close to 45°. In addition, as the size of the PCB 30 decreases, the inclined angle θ of the inclined edge surface is selected at an angle close to 0°.

Figure 4:
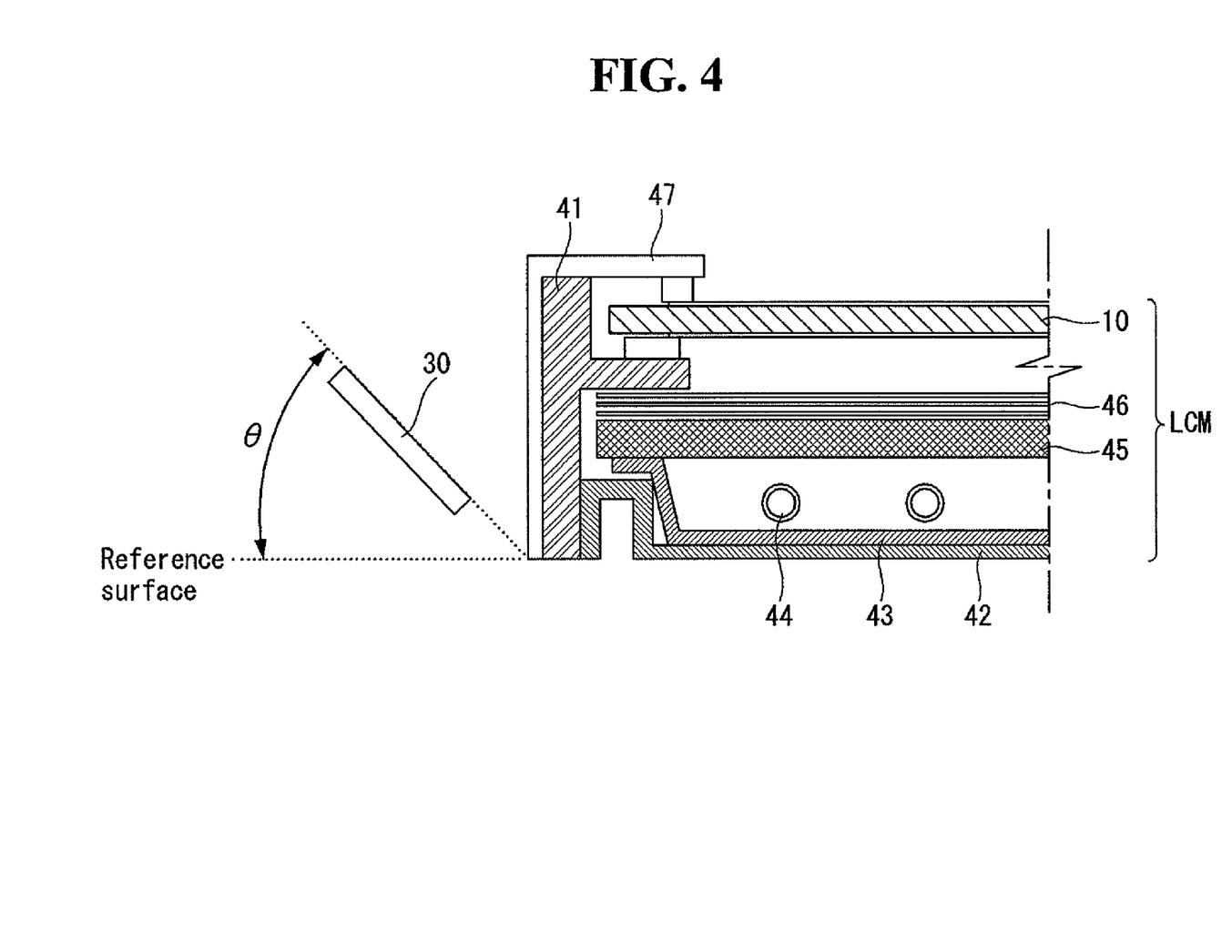
FIGS. 4 and 5 are cross-sectional views illustrating a structure of the liquid crystal module of FIG. 2.

FIG. 4 is a cross-sectional view illustrating an example of applying a direct type backlight unit to the liquid crystal module LCM of FIG. 2.

As shown in FIG. 4, a direct type backlight unit has a structure in which a plurality of optical sheets 46 and a diffusion plate 45 are stacked under the liquid crystal display panel 10 and a plurality of light sources 44 are positioned under the diffusion plate 45.

The optical sheets 46 include at least one prism sheet, at least one diffusion sheet, etc. to diffuse light coming from the diffusion plate 45 and to refract a travelling path of light substantially at a right angle to a light incident surface of the liquid crystal display panel 10. The optical sheets 46 may further include a dual brightness enhancement film (DBEF). A guide panel 41 covers the side of the liquid crystal display panel 10 and the side of the direct type backlight unit and supports the liquid crystal display panel 10 with the guide panel 41 interposed between the liquid crystal display panel 10 and the optical sheets 46. A bottom cover 42 covers a bottom surface of the direct type backlight unit. A diffusion sheet 43 is positioned between the bottom cover 42 and the light sources 44. The light source 44 may include one or at least two of a hot cathode fluorescent lamp (HCFL), a cold cathode fluorescent lamp (CCFL), an external electrode fluorescent lamp (EEFL), and a light emitting diode (LED). A top case 47 covers the side of the liquid crystal display panel 10 and the side of the guide panel 41.

The inclined edge surface may be formed on the bottom surface of the liquid crystal module LCM of FIG. 4 by changing a structure of at least one of the top case 47, the guide panel 41, and the bottom cover 42 or by additionally forming a separate structure at the side of the top case 47. The PCB 30 is faced to the inclined edge surface of the liquid crystal module LCM thus formed.

Figure 5:
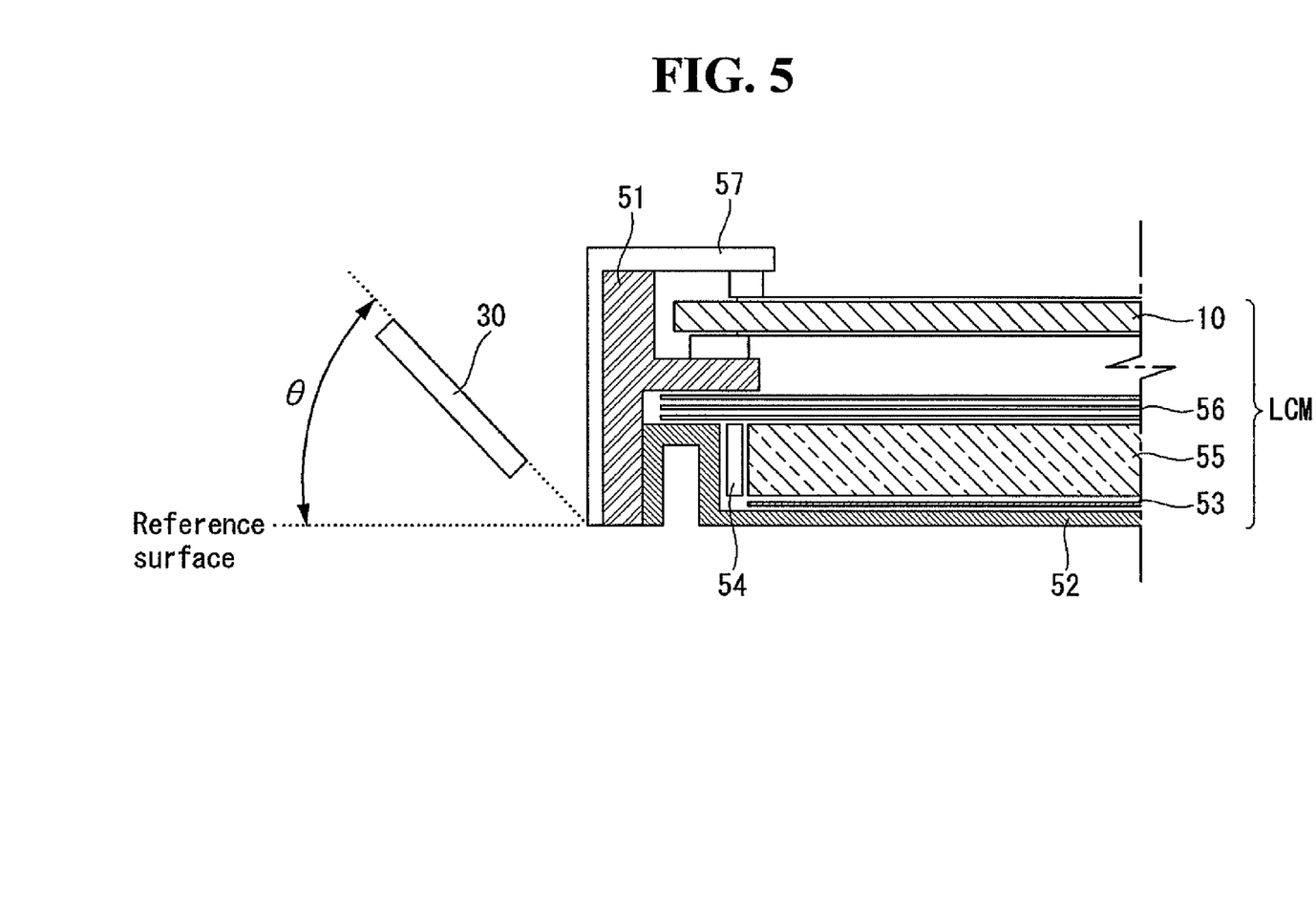

FIG. 5 is a cross-sectional view illustrating an example of applying an edge type backlight unit to the liquid crystal module LCM of FIG. 2.

As shown in FIG. 5, an edge type backlight unit has a structure in which a plurality of optical sheets 56 and a light guide plate 55 are stacked under the liquid crystal display panel 10 and a plurality of light sources 54 are positioned at the side of the light guide plate 55. The liquid crystal module LCM includes guide and case members, such as a guide panel 51, a bottom cover 52, and a top case 57, for fixing the liquid crystal display panel 10 and the edge type backlight unit. A reflective sheet 53 underlying the light guide plate 55 is positioned on the bottom cover 52. The light source 54 may include one or at least two of a HCFL, a CCFL, an EEFL, and a LED. The top case 47 covers the side of the liquid crystal display panel 10 and the side of the guide panel 51.

The inclined edge surface may be formed on the bottom surface of the liquid crystal module LCM of FIG. 5 by changing a structure of at least one of the top case 57, the guide panel 51, and the bottom cover 52 or by additionally forming a separate structure at the side of the top case 57. The PCB 30 is faced to the inclined edge surface of the liquid crystal module LCM thus formed.

Figure 6:
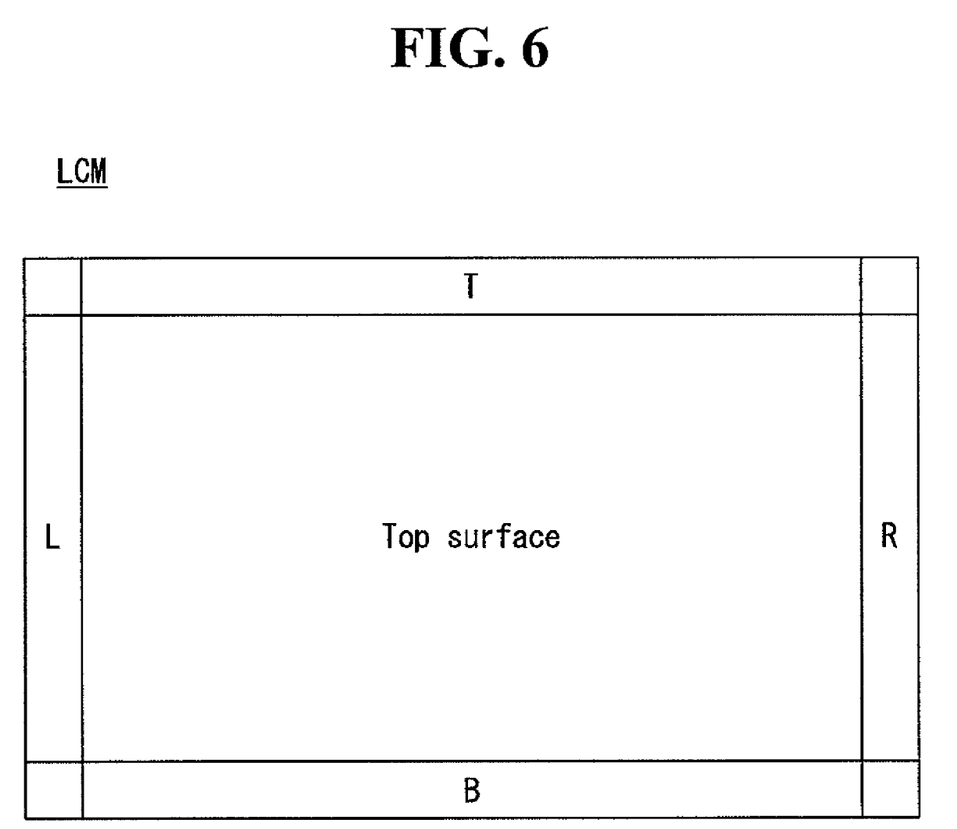
FIG. 6 is a plane view showing a top surface of a liquid crystal module according to a second embodiment of the invention.
Figure 7:
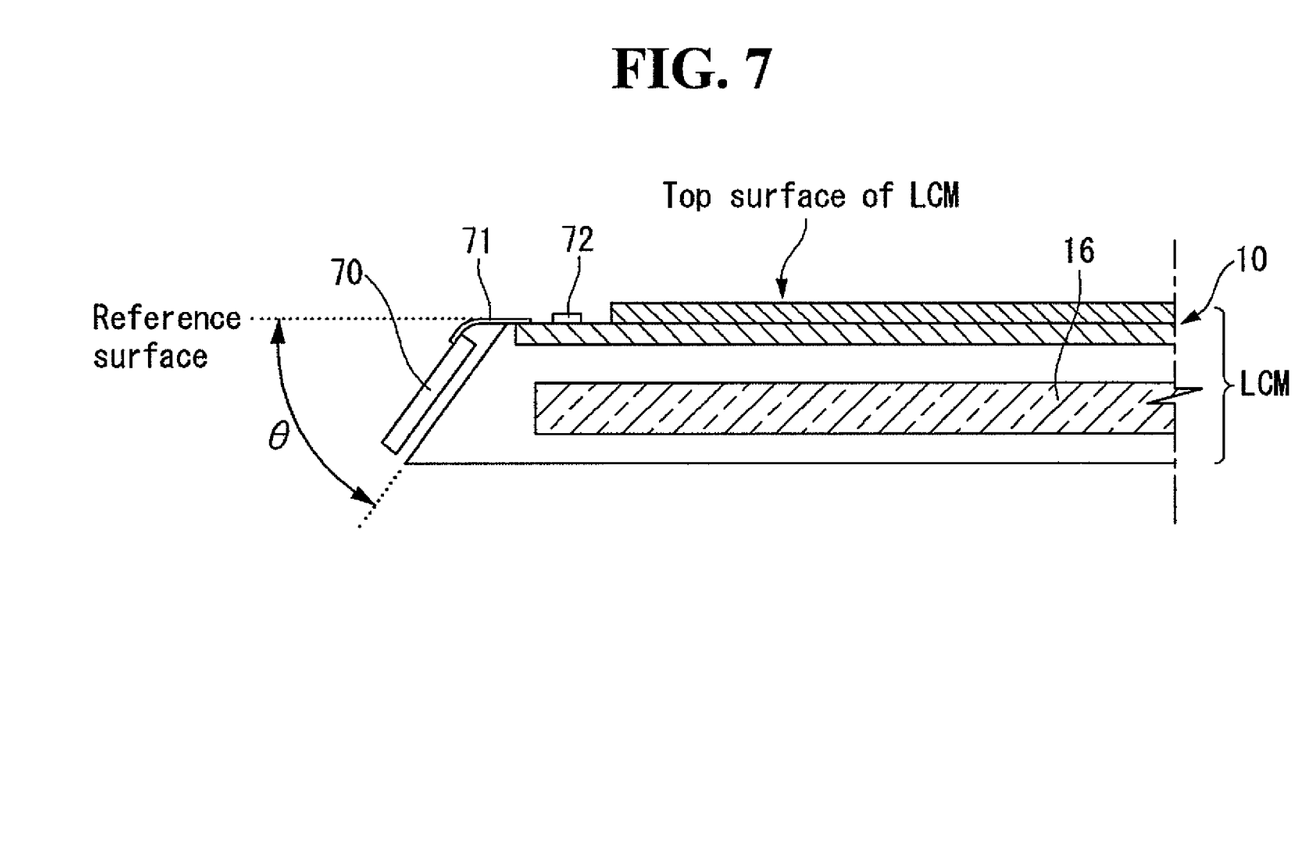
FIG. 7 is a cross-sectional view showing an inclined edge surface of the liquid crystal module of FIG. 6.

FIG. 6 is a plane view showing a top surface of a liquid crystal module according to a second embodiment of the invention. FIG. 7 is a cross-sectional view showing an inclined edge surface of the liquid crystal module of FIG. 6.

As shown in FIGS. 6 and 7, a liquid crystal module LCM according to the second embodiment of the invention includes a liquid crystal display panel 10, a backlight unit 16 underlying the liquid crystal display panel 10, and a PCB 70 connected to the liquid crystal display panel 10.

The liquid crystal module LCM has a rectangular structure. A display screen of the liquid crystal display panel 10 is exposed from a top surface of the liquid crystal module LCM. The backlight unit 16 and a bottom cover to be described later are positioned on a bottom surface of the liquid crystal module LCM. An upper edge surface T, a lower edge surface B, a left edge surface L, and a right edge surface R exist at edges of the top surface of the liquid crystal module LCM. At least one of the upper edge surface T, the lower edge surface B, the left edge surface L, and the right edge surface R is inclined at a predetermined angle. The PCB 70 is positioned on the inclined edge surface. A plurality of lines connecting a timing controller 11 (refer to FIG. 1) and a DC to DC converter 15 (refer to FIG. 1) to source driver ICs 72 may be formed on the PCB 70. The timing controller 11 and the DC to DC converter 15 may be mounted on the PCB 70. Furthermore, a graphic processing circuit and a power circuit of a system board 14 (refer to FIG. 1) may be mounted on the PCB 70. The PCB 70 may be connected to a lower glass substrate of the liquid crystal display panel 10 via a TCP on which the source driver ICs 72 are mounted. Further, the PCB 70 may be connected to the source driver ICs 72 attached to the lower glass substrate of the liquid crystal display panel 10 using a flexible circuit board 71 through a COG process. The PCB 70 is faced to the inclined edge surface formed on the top surface of the liquid crystal module LCM. The PCB 70 may include a plurality of PCBs, so that the PCB 70 can be divided and positioned on at least two inclined edge surfaces. Thus, the PCB 70 may be fixed on the inclined edge surfaces using means, such as an adhesive, a double-sided adhesive tape, and a screw. As a result, the PCB 70 may be incliningly fixed to the liquid crystal module LCM at an inclined angle θ of the inclined edge surface using such a fixing method.

The inclined edge surface is inclined at an angle smaller than 90° from the top surface of the liquid crystal module LCM. Preferably, the inclined angle θ of the inclined edge surface may be greater than 0° and less than 45° to a reference plane extending from the top surface of the liquid crystal module LCM. The inclined angle θ of the inclined edge surface may be selected in consideration of the size of the PCB 70. For example, as the size of the PCB 70 increases, the inclined angle θ of the inclined edge surface is selected at an angle close to 45°. In addition, as the size of the PCB 70 decreases, the inclined angle θ of the inclined edge surface is selected at an angle close to 0°.

Figure 8:
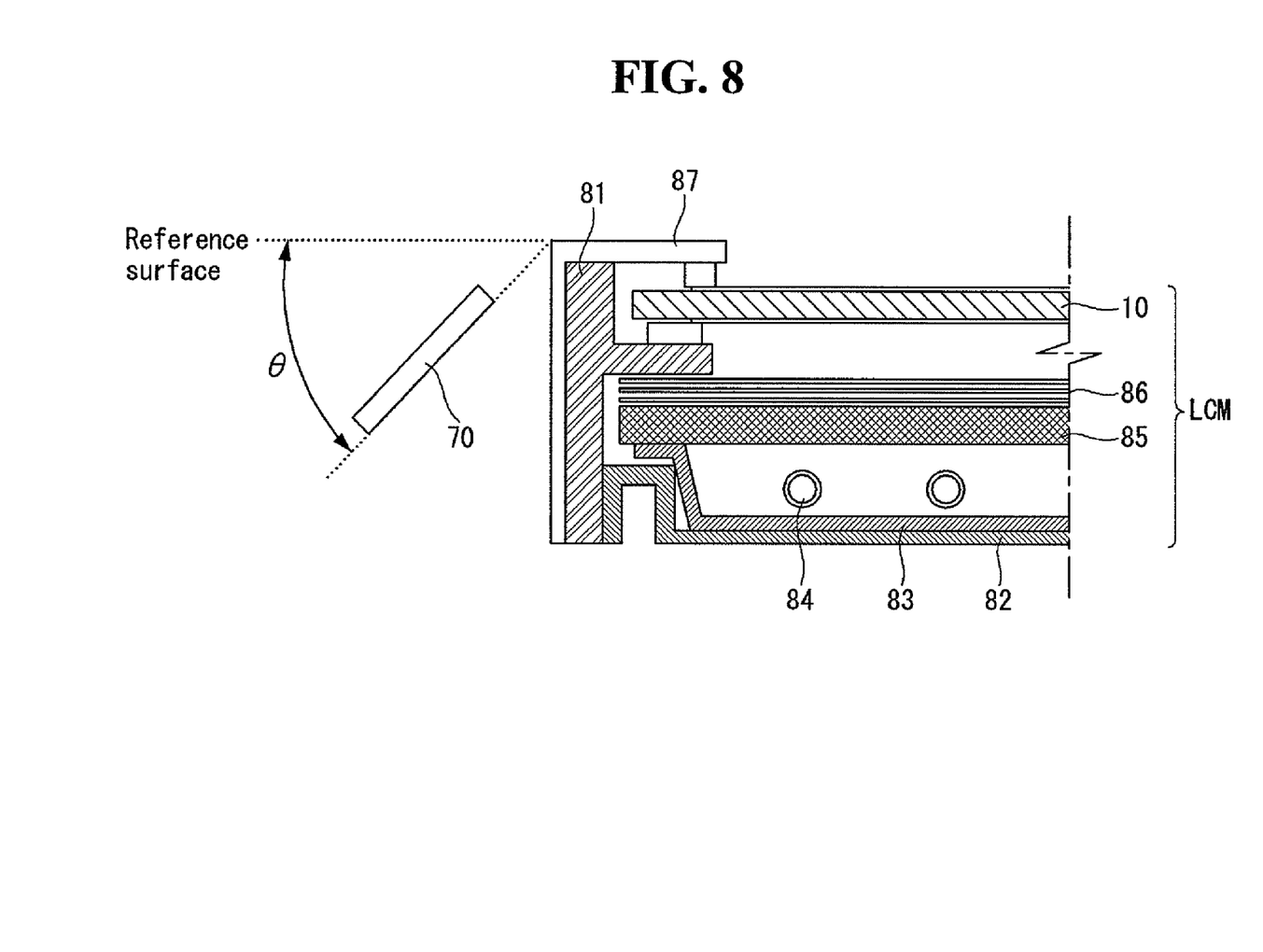
FIGS. 8 and 9 are cross-sectional views illustrating a structure of the liquid crystal module of FIG. 6.

FIG. 8 is a cross-sectional view illustrating an example of applying a direct type backlight unit to the liquid crystal module LCM of FIG. 6.

As shown in FIG. 8, a direct type backlight unit has a structure in which a plurality of optical sheets 86 and a diffusion plate 85 are stacked under the liquid crystal display panel 10 and a plurality of light sources 84 are positioned under the diffusion plate 85.

The optical sheets 86 include at least one prism sheet, at least one diffusion sheet, etc. to diffuse light coming from the diffusion plate 85 and to refract a travelling path of light substantially at a right angle to a light incident surface of the liquid crystal display panel 10. The optical sheets 86 may further include a dual brightness enhancement film (DBEF). A guide panel 81 covers the side of the liquid crystal display panel 10 and the side of the direct type backlight unit and supports the liquid crystal display panel 10 with the guide panel 81 interposed between the liquid crystal display panel 10 and the optical sheets 86. A bottom cover 82 covers a bottom surface of the direct type backlight unit. A diffusion sheet 83 is positioned between the bottom cover 82 and the light sources 84. The light source 84 may include one or at least two of a HCFL, a CCFL, an EEFL, and a LED. A top case 87 covers the side of the liquid crystal display panel 10 and the side of the guide panel 81.

The inclined edge surface may be formed on the top surface of the liquid crystal module LCM of FIG. 8 by changing a structure of at least one of the top case 87, the guide panel 81, and the bottom cover 82 or by additionally forming a separate structure at the side of the top case 87. The PCB 70 is faced to the inclined edge surface of the liquid crystal module LCM thus formed.

Figure 9:
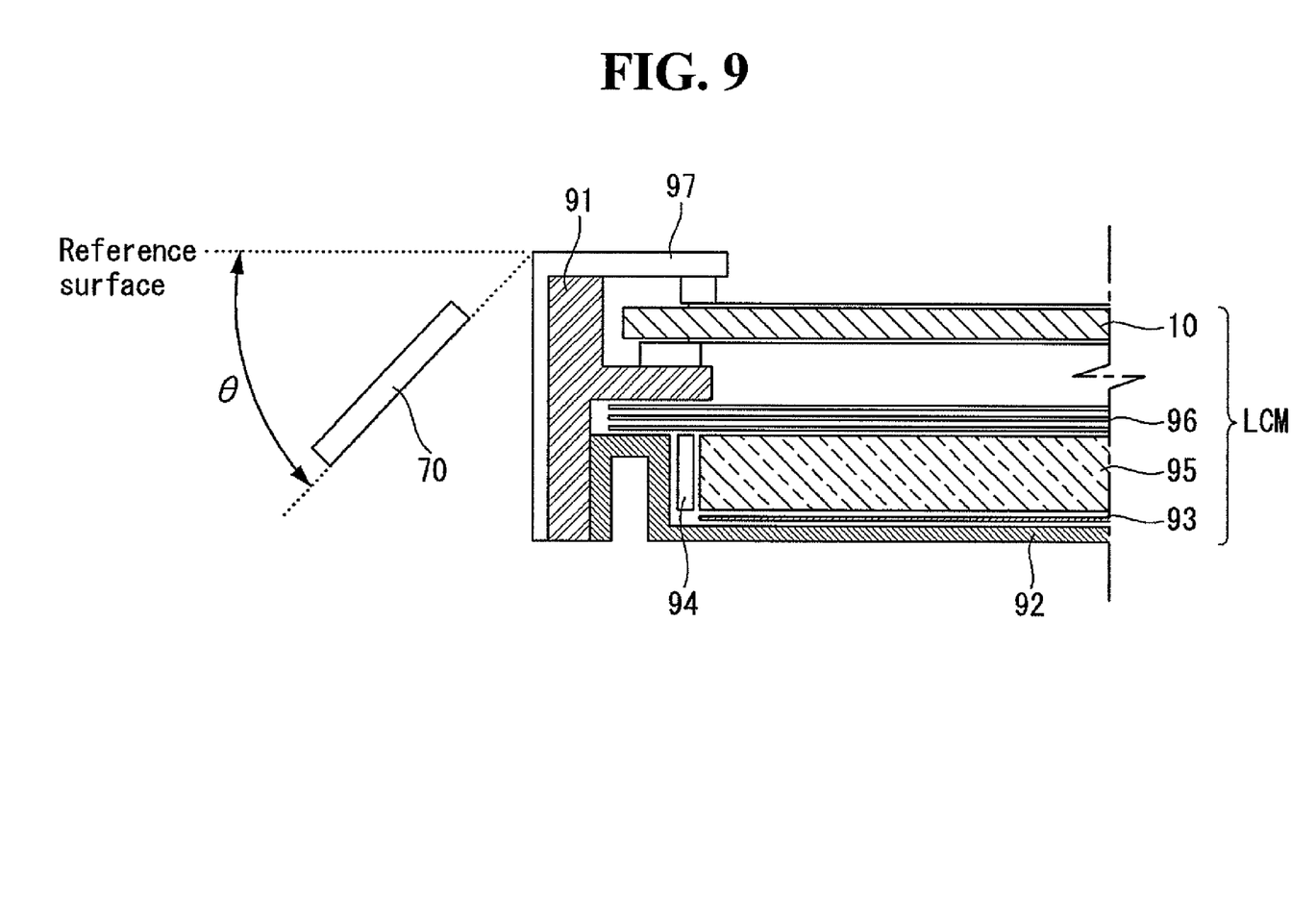

FIG. 9 is a cross-sectional view illustrating an example of applying an edge type backlight unit to the liquid crystal module LCM of FIG. 6.

As shown in FIG. 9, an edge type backlight unit has a structure in which a plurality of optical sheets 96 and a light guide plate 95 are stacked under the liquid crystal display panel 10 and a plurality of light sources 94 are positioned at the side of the light guide plate 95. The liquid crystal module LCM includes guide and case members, such as a guide panel 91, a bottom cover 92, and a top case 97, for fixing the liquid crystal display panel 10 and the edge type backlight unit. A reflective sheet 93 underlying the light guide plate 95 is positioned on the bottom cover 92. The light source 94 may include one or at least two of a HCFL, a CCFL, an EEFL, and a LED.

The inclined edge surface may be formed on the top surface of the liquid crystal module LCM of FIG. 9 by changing a structure of at least one of the top case 97, the guide panel 91, and the bottom cover 92 or by additionally forming a separate structure at the side of the top case 97. The PCB 70 is faced to the inclined edge surface of the liquid crystal module LCM thus formed.

As described above, in the liquid crystal display according to the embodiments of the invention, an inclined surface is formed in at least a portion of the edge of the top surface or the bottom surface of the liquid crystal module, and the PCB is faced to the inclined surface. Accordingly, the bezel area of the liquid crystal module can be reduced by disposing the PCB on the inclined edge surface of the liquid crystal module. Further, the thin profile of the liquid crystal module can be achieved, and the inclined angle of the inclined edge surface can be properly selected depending on the size of the PCB.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
 a liquid crystal module including a liquid crystal display panel and a backlight unit underlying the liquid crystal display panel; and
 a printed circuit board (PCB) connected to the liquid crystal display panel through one of a tape carrier package (TCP), on which integrated circuits (ICs) are mounted, and a flexible circuit board,
 wherein an edge of the liquid crystal module has an inclined surface inclined at an angle smaller than 90° from one of a top surface and a bottom surface of the liquid crystal module, and
 wherein the PCB is directly fixed on the inclined surface.

2. The liquid crystal display of claim 1, wherein the inclined surface is formed at an edge of the bottom surface of the liquid crystal module.

3. The liquid crystal display of claim 2, wherein the inclined surface is inclined at an angle greater than 0° and less than 45° from the bottom surface of the liquid crystal module.

4. The liquid crystal display of claim 3, wherein the PCB is faced to the inclined surface substantially at the same angle as the angle of the inclined surface.

5. The liquid crystal display of claim 1, wherein the inclined surface is formed at an edge of the top surface of the liquid crystal module.

6. The liquid crystal display of claim 5, wherein the inclined surface is inclined at an angle greater than 0° and less than 45° from the top surface of the liquid crystal module.

7. The liquid crystal display of claim 6, wherein the PCB is faced to the inclined surface substantially at the same angle as the angle of the inclined surface.

8. The liquid crystal display of claim 1, wherein the PCB is directly fixed on the inclined surface using an adhesive, a double-sided adhesive tape, or a screw.

9. The liquid crystal display of claim 8, wherein the PCB is directly fixed on the inclined surface with bending toward the inclined surface.

10. The liquid crystal display of claim 1, wherein the PCB is directly fixed on the entire inclined surface.

* * * * *